T. E. MURRAY, Jr., AND J. B. MURRAY.
METHOD OF UNITING METAL RODS TO METAL PLATES.
APPLICATION FILED MAY 31, 1919.

1,316,386.                                   Patented Sept. 16, 1919.

UNITED STATES PATENT OFFICE.

THOMAS E. MURRAY, JR., AND JOSEPH B. MURRAY, OF BROOKLYN, NEW YORK.

METHOD OF UNITING METAL RODS TO METAL PLATES.

1,316,386.     Specification of Letters Patent.     Patented Sept. 16, 1919.

Application filed May 31, 1919. Serial No. 301,044.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Uniting Metal Rods to Metal Plates, of which the following is a specification.

The invention is a method of electrically welding the end of a metal rod to the surface of a metal plate.

In electrically welding together structural members, the need frequently arises of uniting the end of a rod to a plate, so as to form not only a strong joint but one which will be impervious to gas under pressure. This occurs, for example, in the internal bracing or staying of gas tanks, where said pressure may be very high. We have solved the problem in the following way.

In the accompanying drawings—

Figure 1:
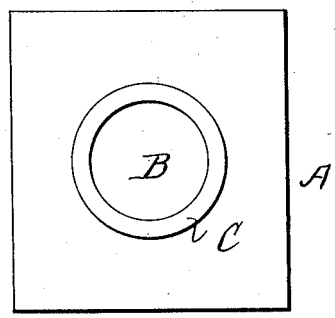
Figure 2:
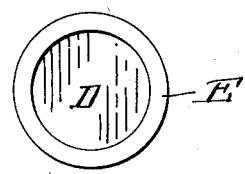
Figure 3:
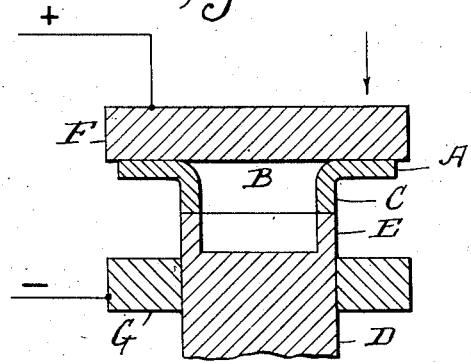
Figure 4:
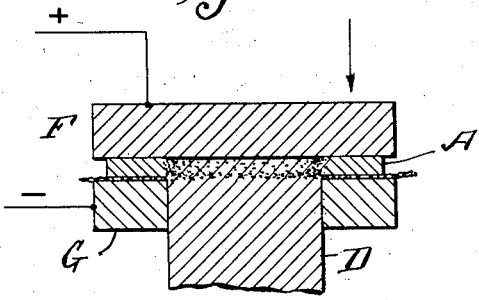

Figure 1 is a plan view of the plate, and Fig. 2 is an end view of the rod to be welded to said plate. Fig. 3 is a section through the electrodes, plate and rod previous to welding, and Fig. 4 is a similar section, after the weld is completed.

Similar letters of reference indicate like parts.

In the plate A we form by pressing or punching an opening B having a flange C, here circular, the diameter of the opening measured across the flange being equal to the diameter of the rod D, also here circular. Upon the end of the rod we form a tubular portion E which registers with flange C when in contact therewith, as shown in Fig. 3. The plate A is secured to electrode F by any suitable means, and the rod D, also by any suitable means, is secured in the ring electrode G. The flange C and the tubular portion E protrude into the space between electrodes F and G and form take-ups. Welding current being established to the electrodes, said electrodes are forced together until the take-ups become fused, the melted metal mostly entering the space within flange C in front of the end face of the rod D and in much less proportion becoming extruded between the electrodes. The fused metal in front of the rod, indicated by dots in Fig. 4, becomes trapped in and fills the opening B in plate A.

At the same time said metal is compressed and condensed and so forced into intimate union with the metal of the rod face and of the surrounding plate, which parts are also highly heated. The result, as shown in Fig. 4, is that the rod and plate become substantially integral, and a perfect joint follows.

We claim:

The method of uniting a metal rod to a metal plate, which consists in forming in said plate an opening surrounded by a flange, and in the end of the rod a tubular portion registering with said flange, placing said rod and plate in welding electrodes so that said flange and tubular portion shall be in contact and form take-ups in the space between said electrodes, establishing the welding current and pressing said electrodes together until said take-ups shall be fused and the metal therefrom trapped in said plate opening in front of the end face of said rod shall have filled said opening and become united with said plate and said rod.

In testimony whereof we have affixed our signatures in presence of two witnesses.

THOMAS E. MURRAY, JR.
JOSEPH B. MURRAY.

Witnesses:
GERTRUDE T. PORTER,
MAY T. McGARRY.